(12) United States Patent
Weiss et al.

(10) Patent No.: US 7,756,026 B2
(45) Date of Patent: Jul. 13, 2010

(54) PROVIDING A QUALITY OF SERVICE FOR VARIOUS CLASSES OF SERVICE FOR TRANSFER OF ELECTRONIC DATA PACKETS

(75) Inventors: Walter Weiss, Douglasville, GA (US); Meuninck Troy, Newnan, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 794 days.

(21) Appl. No.: 11/287,961

(22) Filed: Nov. 28, 2005

(65) Prior Publication Data

US 2006/0239188 A1   Oct. 26, 2006

Related U.S. Application Data

(60) Provisional application No. 60/673,110, filed on Apr. 20, 2005.

(51) Int. Cl.
*H04L 12/26* (2006.01)
(52) U.S. Cl. .................................. 370/230; 370/395.41
(58) Field of Classification Search .................. 370/468
See application file for complete search history.

(56) References Cited

U.S. PATENT DOCUMENTS

| | | | | |
|---|---|---|---|---|
| 5,982,748 A | * | 11/1999 | Yin et al. | 370/232 |
| 6,115,372 A | * | 9/2000 | Dinha | 370/352 |
| 6,452,933 B1 | * | 9/2002 | Duffield et al. | 370/415 |
| 7,031,313 B2 | * | 4/2006 | Yazaki et al. | 370/392 |
| 7,046,680 B1 | * | 5/2006 | McDysan et al. | 370/396 |
| 7,327,675 B1 | | 2/2008 | Goode | |
| 7,359,322 B2 | * | 4/2008 | Khurana et al. | 370/230 |
| 2002/0059432 A1 | * | 5/2002 | Masuda et al. | 709/227 |
| 2003/0053464 A1 | * | 3/2003 | Chen et al. | 370/400 |
| 2004/0057424 A1 | | 3/2004 | Kokkonen | |
| 2006/0239188 A1 | | 10/2006 | Weiss et al. | |
| 2008/0165779 A1 | | 7/2008 | Weiss et al. | |

* cited by examiner

*Primary Examiner*—Steven H Nguyen
*Assistant Examiner*—Alex Skripnikov
(74) *Attorney, Agent, or Firm*—Parks IP Law LLC; Jennifer P. Medlin, Esq.

(57) ABSTRACT

A quality of service for various classes of services for the transfer of electronic data packets is provided by establishing classes of packets for a customer and for assigning bandwidths to the classes for the customer. Accordingly, the amount of bandwidth for one type of service may vary from the bandwidth for another type of service over the same data connection. A device, such as an edge router of a network, may police the data packets being transferred by a customer to maintain the bandwidth being utilized by a given class of packets of the customer to within the assigned bandwidth for that class of the customer. The data packets may further be policed by core routers of the network may also to maintain the bandwidth being utilized by a given class of packets to within the assigned bandwidth for that class as specified by the service provider.

16 Claims, 5 Drawing Sheets

PROVIDING A QUALITY OF SERVICE FOR VARIOUS CLASSES OF SERVICE FOR TRANSFER OF ELECTRONIC DATA PACKETS

RELATED CASES

The present application claims priority to U.S. Provisional Application No. 60/673,110, filed on Apr. 20, 2005, and entitled "Quality of Service Design for Various Classes of Service Being Supported on a Telecommunications Network", the contents of which are incorporated herein by reference.

TECHNICAL FIELD

The present invention relates to the transfer of electronic data packets through a network. More particularly, the present invention relates to providing quality of service for various classes of service for the transfer of electronic data packets.

BACKGROUND

Electronic data packets are transferred from one computer system to another through a network. Networks range from local area networks (LANs) such as home networks and office networks to wide area networks (WANs) such as the Internet. To move data packets from one computer system to another, in certain cases the packets are routed through one or more networks. For routing a packet, the packet may specify a destination address or the destination address may be otherwise known, and intermediate routers within the network receive the packet and forward it downstream based on the destination address.

Moving data packets through the network consumes limited network resources and requires a certain amount of time for the data packets to reach their destinations. The rate at which data packets can be moved from one point to another is referred to as the bandwidth, usually expressed in data bits per second. Each communication link in a network has a fixed amount of bandwidth available for carrying data packets.

When customers purchase network access, the purchase involves acquiring a certain amount of bandwidth between the router or other communication device located at the customer premises and an edge router located within a network of a service provider. The edge router may have many ports connected to many different customers, and the edge router has one or more ports connected to core routers of the service provider network. The edge router has a limited amount of bandwidth for exchanging packets through each port to the customers as well as a limited amount of bandwidth for exchanging packets through the port linked to the core router. The total bandwidth offered to the customers is bounded by the bandwidth available between the edge router and the core router.

Customers may desire to transfer packets for various types or classes of services, such as those defined by Request for Comments (RFC) 2597. For example, a single customer may utilize the network to transfer packets for a real-time service such as for voice-over Internet Protocol (VoIP) telephone calls, while also transferring packets for an interactive service such as video, while also transferring packets for business services such as access to remote file servers, while also transferring packets for more general services such as Internet surfing. However, in transferring all of these packets of various services, the customer may experience poor quality services because not enough bandwidth is available for one service due to the bandwidth being used for packets of other services. For example, VoIP call quality may become unacceptable because the data connection to the network is using a substantial amount of bandwidth for Internet surfing and file transfers.

SUMMARY

Exemplary embodiments described herein address these and other issues by providing devices, computer program products, and methods that establish a quality of service for various classes of service for the transfer of electronic data packets. The packets for the various types of services may be marked within a given class by the customer. The customer may purchase a certain amount of bandwidth and have that bandwidth be allocated across the various classes. The transfer of packets by the customer may then be maintained within the bandwidth constraints by the edge router policing the data packets being transferred in each class relative to the bandwidth assigned to each class. Furthermore, core routers may also maintain the transfer of packets within bandwidth constraints set by the service provider for the core of the network. Accordingly, packets for services requiring more bandwidth may be provided with more bandwidth than packets for services requiring less bandwidth.

According to one embodiment, a computer program product is provided that includes instructions that when performed by a computer perform acts including receiving electronic data packets from a plurality of customers, wherein the packets are classified according to markings provided by each customer that identify the class of service to which each packet belongs. The acts further include detecting the marking of each packet and recognizing which customer submitted the packet, and acting upon the packets in accordance with a bandwidth assigned for each class of service for each customer to forward the packets within the assigned bandwidth.

According to another embodiment, a device is provided for establishing a quality of service for various classes of service for electronic data packets received from a plurality of customer networks. The device includes a plurality of customer ports, wherein each customer port exchanges electronic data packets with a customer network. The device includes a memory that stores a set of classes of service for each customer port and stores a bandwidth for each class stored for each customer port. The device further includes a processor that provides bandwidth for the electronic data packets exchanged through the plurality of customer ports in accordance with the class of the electronic data packets detected from markings of the electronic data packets and in accordance with the bandwidth assigned to the class for each customer port.

According to another embodiment, a method is provided for providing a quality of service for various classes of service for electronic data packets. The method involves receiving packets from a plurality of customers, wherein the packets are classified according to markings provided by each customer that identify the class of service to which each packet belongs. The method further involves detecting the marking of each packet and recognizing which customer submitted each packet and forwarding the packets within the assigned bandwidth assigned for each class and customer.

DETAILED DESCRIPTION

Exemplary embodiments provide for a quality of service for various classes of service for electronic data packet transfer through a service provider network. Customers may purchase a scheme of handling data packets of different types or classes from a service provider. The service provider may then provide a quality of service by maintaining the bandwidth availability for each class and policing each class to prevent a customer from exceeding the purchased bandwidth for each class.

Figure 1:
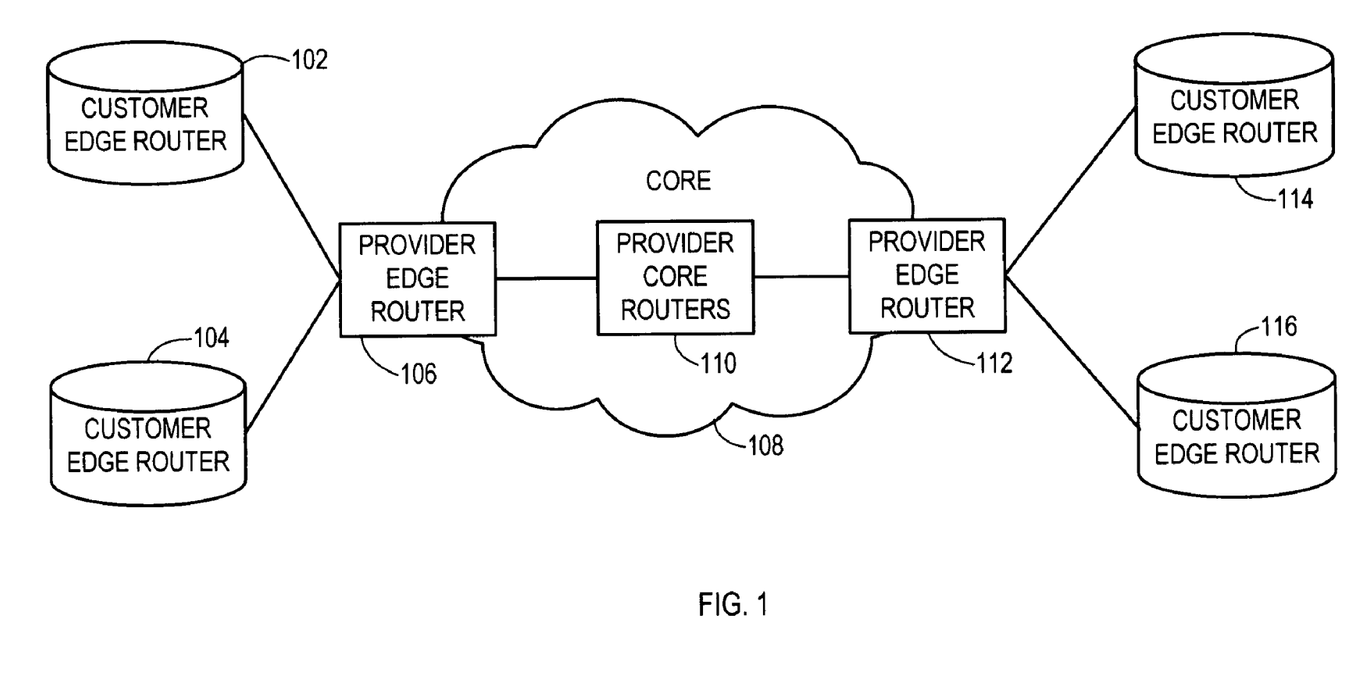
FIG. 1 shows an exemplary configuration of a service provider network interconnecting customers.

FIG. 1 shows customers interconnected to a service provider network in an exemplary embodiment. The customers have customer devices that send and receive data packets. In the example of FIG. 1, the customers have routers 102, 104, 114, and 116 that directly interface with the service provider network via service provider routers 106, 112 over an access link, such as a digital subscriber line, a T1 link, a frame relay link, an asynchronous transfer mode link, etc. The customer routers 102, 104, 114, and 116 are on the edge of the customer network and are referred to herein as customer edge routers. Likewise, the provider routers 106, 112 are on the edge of the service provider network and are referred to herein as provider edge routers.

The service provider network has a core 108 between edge routers 106, 112. The core 108 includes provider core routers 110. As can be seen, the edge routers 106, 112 aggregate communications from various customer edge routers 102, 104, 114, 116 while the core routers 110 aggregate communications from various provider edge routers 112, 116. While the core routers 110 are shown as a single box for purposes of illustration, it will be appreciated that the core routers 110 may include many routers with additional aggregation occurring.

To establish classes of service and quality of service for those classes, the data packets being exchanged between the provider edge routers 106, 112 and the customer edge routers 102, 104, 114, 116 are marked by the sending router in a manner that is recognizable by the receiving router. For example, the data packets may be transferred through an Internet Protocol (IP) in use between the edge routers such that a marking is included in the header of each IP packet. Specifically in the context of IPv4, the markings may be included per RFC 791 in the Type of Service (TOS) byte location, where this byte has been redefined by RFC 2474 and RFC 2475 as Differentiated Services Code Point (DSCP) values. Each class of service has a different marking to be included in this byte of the IP header, where the customer edge router and the provider edge router are configured to recognize the same markings for the same classes of service.

The class of service is maintained during transfer through the core 108. However, the core 108 may utilize a different marking scheme to recognize and transfer the packets of the various classes. For example, the core 108 may utilize a label marking scheme such as Multiprotocol Label Switching (MPLS). In such a case, the provider edge router 106, 112 maps between the DSCP marking from the customer and the MPLS marking of the core. This mapping is discussed in more detail below.

Figure 2:
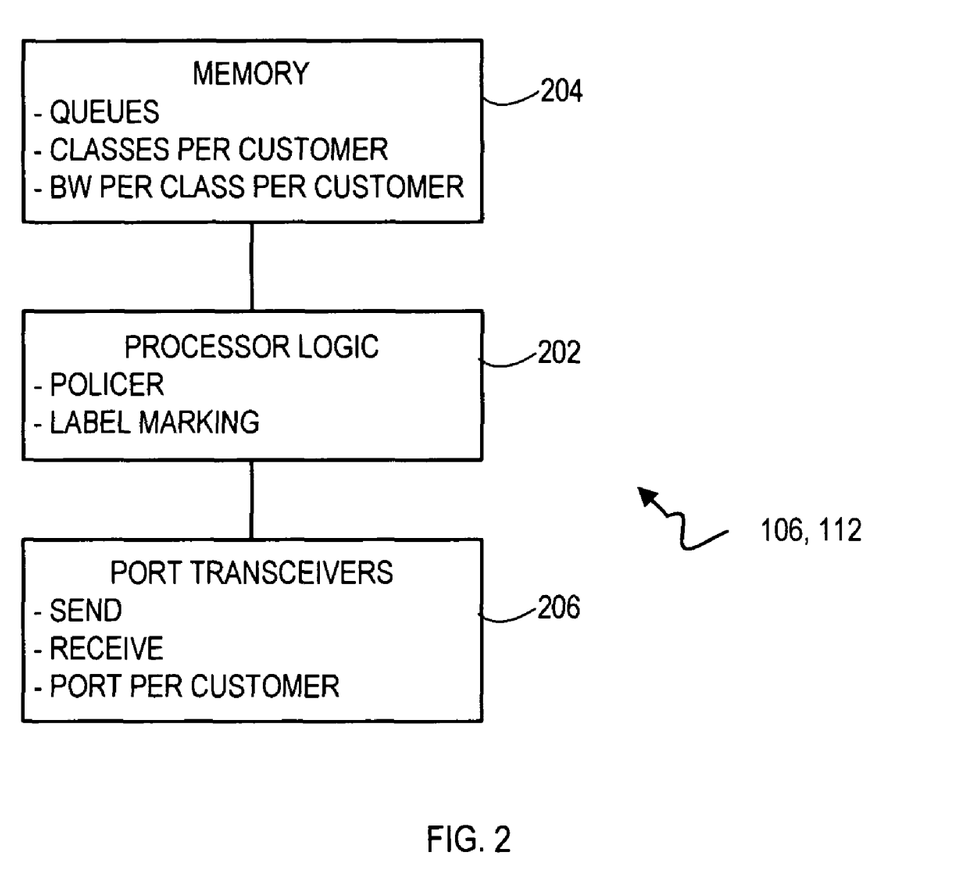
FIG. 2 shows components of an edge router of the service provider network according to an exemplary embodiment.

FIG. 2 shows the components of a provider edge router 106, 112 for recognizing the classes of service and for implementing the quality of service for the various classes according to exemplary embodiments. The provider edge router 106, 112 includes a processor 202, such as a general-purpose programmable processor or a dedicated purpose processor, where this processor implements policer logic and label marking logic. As discussed below, the policer logic ensures that a given customer transferring packets via the edge router is not exceeding the bandwidth for a given class. The policer may also perform additional functions such as borrowing from bandwidth for one class of service to allow additional bandwidth for a different class, and establishing supplemental burst classes for one or more classes, where the burst class is used to handle packets exceeding the bandwidth for the primary class.

The processor 202 communicates with a memory device 204 that stores data including data packets being queued for transfer out of the provider edge router. The processor 202 implements queues for the various classes by recognizing the class from the markings of incoming packets and queues the packets accordingly for transfer. The memory 204 may also store the quality of service parameters including the classes to be recognized for a given customer and the bandwidth allocated per class for each customer. Accordingly, the policer logic of the processor 202 may rely upon this customer data when handling packets being exchanged through a port assigned to a particular customer.

Port transceivers 206 are also included to handle the physical exchange of the data packets. The port transceivers serve to physically send and receive the data packets over the wired or wireless connection between the provider edge router and the customer edge router. Each port is assigned to a particular customer so that data being exchanged through a particular port can be policed by the processor 202 according to the customer parameters stored in memory 204.

Furthermore, at least one port transceiver is also included in the set of port transceivers 206 in order to send and receive data packets over the connection between the provider edge router and the core router(s). Network level quality of service parameters stored in memory 204 may be applied by the processor 202 to ensure that the proper bandwidth is used for each class of service being exchanged with core routers.

FIGS. 3-7 show examples of the transfer of specific classes of data packets between the customer and provider edge routers. These figures illustrate the application of ingress and egress queues and label marking procedures being performed by the provider edge routers 106, 112. Tables 1-3 below illustrate one example of the classes of service, queue names being used, queue configuration being used, DSCP markings being used, and label switching markings being used. Table 1 defines the ingress queues of the provider edge router relative to the customer, Table 2 defines the egress queues of the provider edge router relative to the customer, and Table 3 defines the queues in the core network. In this example, there are five classes of service mapped to four queues for data packet traffic from customers. The provider edge router classifies these five classes of service to five classes of service in the core and four queues.

TABLE 1

Ingress Queues from Customer

| Queue Name | Queue Configuration | DiffServ (DSCP) | Class Description |
|---|---|---|---|
| Low Latency Interactive | LLQ/Tail Drop MDRR/Tail Drop | EF AF41 CS6 | Voice Interactive video Routing Updates |
| Business Priority | MDRR/minimum bandwidth | AF21 | Business data |
| Default | MDRR minimum bandwidth | 00 | All other traffic |

TABLE 2

Egress Queues to Customer

| Queue Name | Queue Configuration | DiffServ (DSCP) | Class Description |
|---|---|---|---|
| Low Latency Interactive | LLQ/Tail Drop MDRR/Tail Drop | EF AF41 CS6 | Voice Interactive video Routing Updates |
| Business Priority | MDRR/minimum bandwidth | AF21 | Business data |
| Default | MDRR/minimum bandwidth | 00 | All other traffic |

TABLE 3

Egress Queues to Core

| Queue Name | Queue Configuration | DiffServ (DSCP) | IP MPLS EXP Markings |
|---|---|---|---|
| Low Latency Interactive | LLQ/Tail Drop CBWFQ | EF AF41/CS6 | 5 6/7 |
| Priority Data | MDRR/WRED | AF21 | 2/3 |
| Business Best Effort | MDRR/WRED | 01 | 1 |
| Internet Best Effort | MDRR/WRED | 00 | 0 |

A class for voice over IP (VoIP) is supported by a Low latency/Priority queue EF in this example. The VoIP class uses Low Latency Queuing (LLQ) feature. A maximum bandwidth is allocated to this queue according to VoIP capacity planning from the customer's site. VoIP will be policed to the configured bandwidth when the interface experiences congestion. This class is mapped to the Premium backbone class on the core routers using an MPLS EXP value of 101 (5).

A Video class AF41 of this example is policed to a maximum bandwidth. This will ensure that the Best Effort queue is protected. This class is mapped to the optimized backbone class using an MPLS EXP value of 111 (7).

A Business Data class AF21 of this example will be supported by a minimum bandwidth guaranteed class. This guarantees that bandwidth will always be available for packets in this class. An active queue manager, referred to as weighted random early detection (WRED) is used for this queue and is set to react to drop preference encodings following an Assured Forwarding Per-Hop-Behavior (PHB) Group. This class is mapped to the Optimized backbone class using an MPLS EXP value of 010 (2).

A Best Effort class of this example is the default class of service for all other traffic. All traffic that does not match the other traffic classes is mapped to the Best Effort traffic class. The Best Effort traffic class is treated as flow-based with weighted fair queuing (WFQ). The active queue manager WRED is also used for this queue and will be set to react to drop preference encodings following the Assured Forwarding PHB Group. The class is mapped to the Best Effort backbone class using MPLS EXP value of 000 (0).

A Control Class of this example is for routing protocols. Bandwidth is reserved for control traffic to ensure that routing protocols are not starved for bandwidth. All control traffic originated by the edge router is placed at the head of the queue in the default bandwidth class. There are no user controls to adjust the traffic mapped to this internal behavior. Flow-based WFQ is used within the default class to ensure fair bandwidth utilization among the flows. In this example, the default class is left with a maximum of 25% of the bandwidth to conform to the default bandwidth allocation guidelines of routing equipment such as that from Cisco Systems, Inc. of San Jose, Calif. In another example, such as for routers from Juniper Networks of Sunnyvale, Calif., 5% of the bandwidth is reserved for the control class. This class is mapped to the Control backbone class using an MPLS EXP value of 110 (6). The Network control traffic shares the Interactive queue in the core with the EXP 3 traffic.

Traffic generated by the edge router represents a special case for outbound service policies. Some locally generated traffic is treated as any other user traffic, and the quality of service system applies the configured quality of service mechanisms to this traffic. An example of such traffic is performance probes that are designed to measure the behavior incurred by packets of a given class. Other locally generated traffic, particularly Layer 2 keep-alives and routing protocol messages, are not be subject to some quality of service features. For example, WRED may not drop Layer 2 keep-alives when the average queue depth reaches a high watermark.

Figure 3:
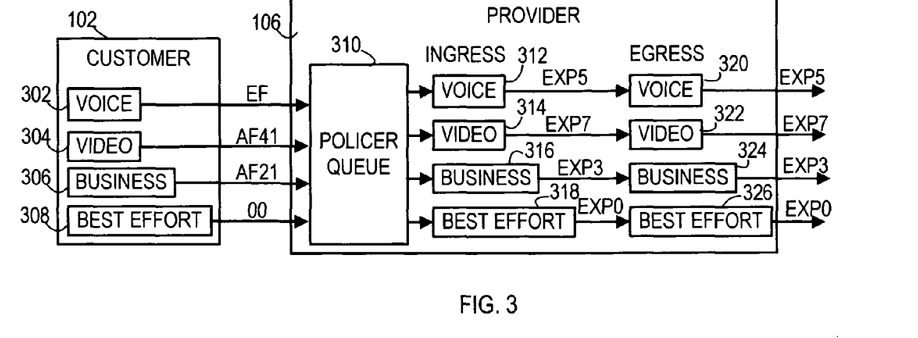
FIG. 3 shows communications of packets properly marked for various classes of service from a customer device and to an edge router of the service provider network according to an exemplary embodiment.

FIG. 3 shows an exemplary application of the policer and labeling logic of the provider edge router 106 acting upon properly marked data packets being received from the customer edge router 102. Initially, the customer edge router 102 has separately queued and marked the data packets for each of the classes of service for which the customer has purchased quality of service handling. A queue 302 maintains voice packets marked with the DSCP EF. A queue 304 maintains video packets marked with the DSCP AF41. A queue 306 maintains priority business packets marked with the DSCP AF21. A queue 308 maintains best effort packets marked with the DSCP 00 or left unmarked. The packets are transferred from customer edge router 102 over the data connection to the provider edge router 106. The customer edge router 102 may employ a scheme for scheduling the transfer of the various classes of packets from the queues, where the scheme allocates a certain bandwidth to each class. This scheme is based on the bandwidth purchased per class from the network service provider by the customer. Table 4 shows an example of the various schemes or templates for quality of service that the customer may purchase, where the percentage is converted to bits per second relative to the total bandwidth available for the connection. As can be seen, in most instances, the total bandwidth allocated is less than 100% of that which is available for the data connection in order to reserve some bandwidth for sharing, and to maintain the Best Effort percentage at a lower percentage so that it is ranked lower for purposes of sharing the unallocated bandwidth.

324, and best effort packets are placed in a best effort egress queue 326. The packets are then forwarded into the core according to the network level quality of service parameters configured to provide appropriate bandwidth into the core for each of the classes.

In this example, the business priority traffic class has a minimum scheduled bandwidth to ensure that it will meet its service level. This minimum scheduled bandwidth ensures that other traffic classes cannot affect the business priority traffic class. In addition for this example, the traffic demands in the business data traffic class have the ability to use bandwidth from the other Classes of Service, if bandwidth is available.

TABLE 4

Quality of Service Options

| Class | COS Basic Template A | Template B | COS Premium Template C | Template D | Template E | Template F | COS Custom Template G | Template H |
|---|---|---|---|---|---|---|---|---|
| Real-Time | N/A | N/A | 25% | 50% | N/A | 30% | 70% | 35% |
| Interactive | N/A | N/A | 25% | 5% | 50% | 20% | 5% | 5% |
| Business | 50% | 75% | 25% | 25% | 25% | 25% | 15% | 20% |
| Best Effort | 10% | 10% | 10% | 10% | 10% | 10% | 10% | 10% |

The template percentages of Table 4 describe minimum bandwidths for each class of service. This means that in times of congestion, this is the minimum amount of bandwidth the queue will be serviced. The minimum bandwidth for a queue will be allowed to grow as long as there is available bandwidth from the other queues, e.g., the best effort queue may have 10% minimum bandwidth, if the other queues are not using all of their allotted bandwidth, the best effort queue is allowed to send more traffic if needed. The policers may be configured so that this is the case for the best effort and business queues, which are allowed to transmit up-to line rate. The Real-Time and Interactive queues may instead be policed up-to a threshold and any traffic that exceeds will be tail dropped.

In addition to the customer edge router 102 being configured to schedule the transfer of packets based on the quality of service option that has been chosen, the provider edge router 106 is configured to police the incoming packets relative to the quality of service option. The policer logic and queue for recognizing each class of service of the provider edge router 106 is represented by policer box 310 of FIG. 3. The incoming packets from the customer are received into the policer box 310 where the DSCP marking is examined to determine the class of service. In this example of FIG. 3, the DSCP EF corresponds to voice so that the EF marked packets are placed in a voice ingress queue 312 where the labeling logic then applies the MPLS label of EXP 5. The DSCP AF41 corresponds to video so that the AF41 marked packets are placed in a video ingress queue 314 where the labeling logic then applies the MPLS label of EXP 7. The DSCP AF21 corresponds to business so that the AF21 marked packets are placed in a business ingress queue 316 where the labeling logic then applies the MPLS label of EXP 3. The DSCP 00 corresponds to best effort so that the 00 marked packets are placed in a best effort ingress queue 318 where the labeling logic then applies the MPLS label of EXP 0.

Once properly queued and labeled for the core, the packets are placed into the corresponding egress queues for transfer into the core. The voice packets are placed in a voice egress queue 320, video packets are placed in a video egress queue 322, business packets are placed in a business egress queue A policer is implemented for real-time traffic to protect the Best Effort data class from being starved by non-rate adaptive traffic flows. Real-time traffic does not respond to link congestion (i.e. packet loss) by reducing load. If the real-time application's Call Admission Control (CAC) system is misconfigured or fails, non-policed real-time load could starve traffic associated with the Best Effort data class but for the presence of the policer.

The VoIP class is configured with a LLQ feature that provides an inherent policer as part of the priority queuing implementation. Without this policer, traffic mapped to a priority queue could starve other queues of bandwidth. The built-in LLQ policer will rate limit the Ingress interface and schedule a requested percentage of the bandwidth to the EF priority queue. This prevents VoIP from starving the other service classes. Call managers may be configured with call-admission control to keep traffic within the limits of the low latency queue.

Figure 4:
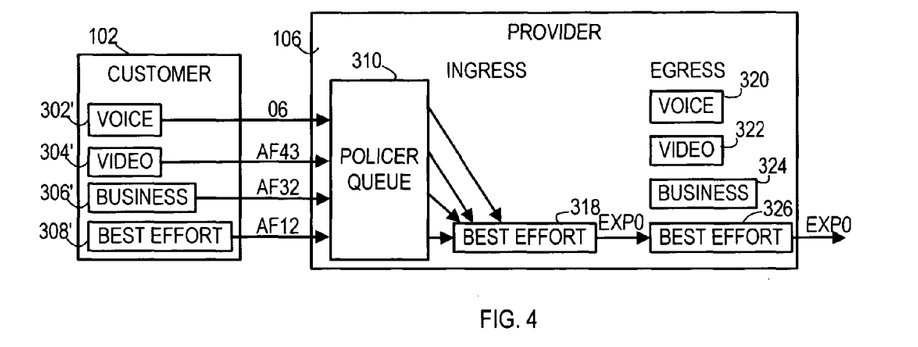
FIG. 4 shows communications of packets improperly marked for various classes of service from a customer device to an edge router of the service provider network according to an exemplary embodiment.

FIG. 4 shows an exemplary transfer of packets where the customer has improperly marked each of the classes of service. In this example, the voice queue 302' of customer edge router 102 has voice packets improperly marked as 06. The video queue 304' of customer edge router 102 has video packets improperly marked as AF43. The business queue 306' of customer edge router 102 has business packets improperly marked as AF32. The voice queue 308' of customer edge router 102 has best effort packets improperly marked as AF12.

The policer box 310 of provider edge router 106 receives the incoming packets and recognizes none of the markings since each class is improperly marked. Accordingly, in this example, the policer logic directs all of the packets to the best effort ingress queue 318 as the default ingress queue for unrecognizable class markings. Here, the packets are provided with an MPLS label EXP 0 corresponding to the best effort class. The packets are then queued for transport within the best effort egress queue 326 form which they are forwarded into the core according to the network level quality of service parameters.

Figure 5:
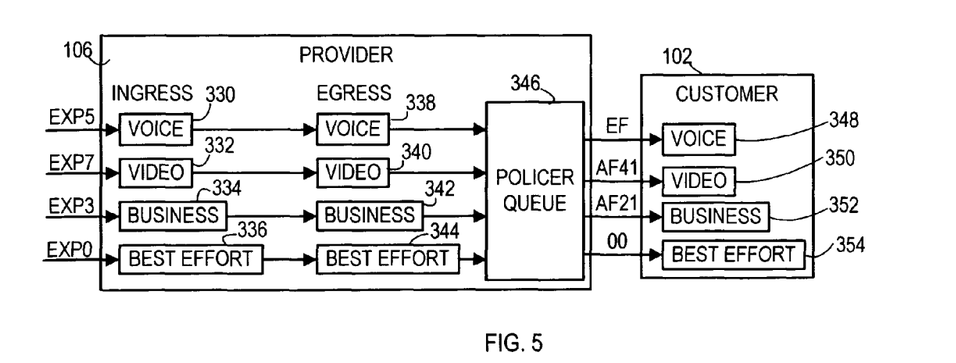
FIG. 5 shows communications of packets properly marked for various classes of service from an edge router of the service provider network to a customer device according to an exemplary embodiment.

FIG. 5 shows an exemplary operation of the provider edge router 106 for packets being received from the core and destined for the customer edge router 102. The packets are received into the appropriate ingress queues based on the MPLS markings of the header. Voice packets marked EXP 5 are placed into the ingress queue 330, video packets marked EXP 7 are placed into the ingress queue 332, business packets marked EXP 3 are placed into the ingress queue 334, and best effort packets marked EXP 0 are placed into the ingress queue 336. The packets are then scheduled for transfer within egress queues where policer logic can then be applied to ensure the quality of service is maintained for transfer of packets to the customer edge router 102.

Egress queue 338 includes voice packets and the policer box 346 schedules them according to the voice class bandwidth and label logic removes the MPLS header while the DSCP marking EF of the IP header is maintained for transfer to router 102. Egress queue 340 includes video packets and the policer box 346 schedules them according to the video class bandwidth and label logic removes the MPLS header while the DSCP marking AF41 of the IP header is maintained for transfer to router 102. Egress queue 342 includes business packets and the policer box 346 schedules them according to the business class bandwidth and label logic removes the MPLS header while the DSCP marking AF21 of the IP header is maintained for transfer to router 102. Egress queue 344 includes best effort packets and the policer box 346 schedules them according to the best effort class bandwidth and label logic removes the MPLS header while the DSCP marking 00 of the IP header is maintained for transfer to router 102.

The EF class is policed at the egress point to the customer edge router 102 so that only the requested EF bandwidth is allowed through egress. The EF traffic to a host site may be over subscribed for the installed circuit, so the EF traffic is policed to ensure the AF and best effort classes are not starved on the egress.

The Video traffic class supports real-time, interactive traffic sources without letting these sources dominate link capacity during adverse or failure conditions. A class-based policer is used to support this design does not disturb the allowed number of video calls to and from a site. If a site is allowed one active video call, the policer is setup so that it does not disturb the traffic of a single call, but the policer does not allow a 2nd or 3rd call to startup and dominate the link capacity. The number of video calls at a site may be controlled by a form of call admission scheme, and the policer for video traffic is implemented as a fail-safe in that instance.

The business data service class may be policed for management purposes. The customer's conform rate will be transmitted and the exceed rate will also be transmitted, but with a lower EXP setting. In times of congestion the exceeding bandwidth will be dropped before complying traffic. Using this policer, a management team of the service provider will be able to see how much customer traffic is exceeding their subscribed class of service rate, without affecting customer traffic. Business data may also have a guaranteed minimum bandwidth and is allowed to make use of any available bandwidth on the link, when not used by the other classes. Unused bandwidth on an interface is allocated to the bandwidth classes in proportion to their minimum bandwidth allocation.

Best Effort Traffic may also be policed for management purposes. The customer's conform rate will be transmitted and the exceed rate will be also be transmitted. Using this policer, the management team will be able to see how much customer traffic is exceeding their subscribed class of service rate, without affecting customer traffic. Best effort may also be guaranteed a minimum bandwidth, so in times of congestion for other classes of service, this class of service will not be starved of bandwidth.

As discussed above, the transfer of packets through the core may utilize a network level quality of service bandwidth allocation. As one example, at the network level the quality of service may be defined as follows for each of the classes of service discussed above.

The Real-Time queue may not be given a minimum allotted bandwidth. The Real-Time traffic through the core may be scheduled so that there is always sufficient bandwidth available. After the Real-Time queue has taken its bandwidth, the other queues then share the remaining bandwidth.

The Interactive queue may share EXP 7 (AF41) with routing updates CS6. The Interactive queue may be scheduled to utilize 50% of the remaining bandwidth, after the real-time queue has taken its bandwidth. WRED will be used to differentiate between these two classes in this queue.

The AF classes of Service EXP 2 and 3 are grouped together in one queue and use WRED. EXP 3 is burst business traffic, and therefore, WRED will drop EXP 3 before EXP 2. The AF queue will use the remainder 40% of the bandwidth, after the real-time queue has taken its bandwidth. Further discussion of the burst business traffic is provided below in relation to FIGS. 6 and 7.

The Best Effort queue uses the 10% of remaining bandwidth, after the real-time queue has taken its bandwidth.

In this example, the Interactive, AF, and Best Effort queues will have a 5:4:1 ratio. Therefore the Interactive and AF queues will have 40% more scheduled bandwidth than the Best Effort queue. This is set forth in Table 6 below.

TABLE 6

Core Network Quality of Service

| Core Queue | Bandwidth Reservation Percentage |
|---|---|
| Real-Time (EXP 5) | No reservation, priority based |
| Interactive, Network Control (EXP 7, 6) | 50% |
| AF Queue (EXP 2, 3) | 40% |
| Best Effort (EXP 0, 1) | 10% |

The service provider network may be a core transport for a wide range of users, i.e. DSL home Internet, DIA, business class users for IP virtual private networking (IP-VPN), and wholesale users. All users may share similar queues in the core such that if a Denial of Service (DOS) attack infects the core network, all user types are affected. The DOS attack will cause UDP network congestion. WRED will only control TCP traffic and not UDP, therefore, this traffic will potentially cause the Best Effort Class to run into saturation, affecting all user types including priority business customers, who have taken precautions against these attacks.

Therefore IP-VPN customers may use a Best Effort class of service which has a lower drop probability than the default Best Effort queue. This protects the priority business customers from DOS attacks generated by the inexperienced home DSL user. In the event of a DOS attack on the default Best Effort class of service, it will be isolated from the priority business user. The maximum bandwidth allocated for the default Best Effort class of service will be reached and excess traffic will be tail dropped. As indicated in Table 6, this Best Effort class may utilize MPLS marking EXP 1 rather than EXP 0 such that this Best Effort class is differentiated within the service provider network.

Figure 6:
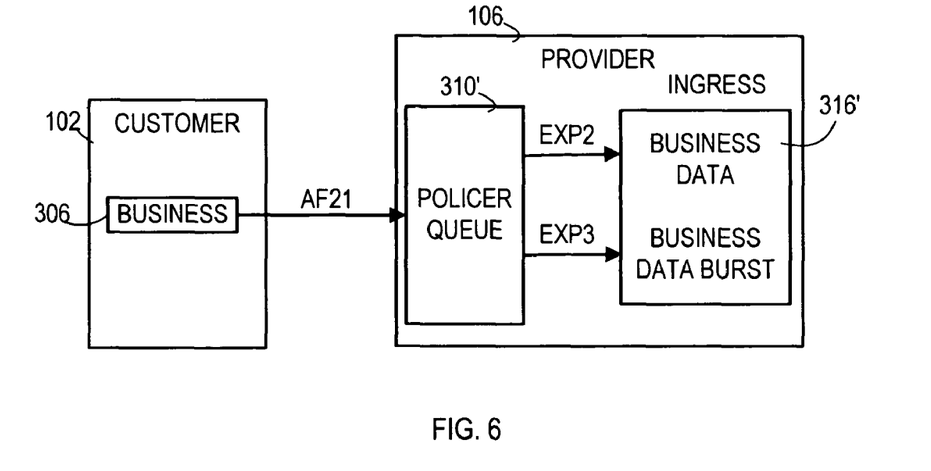
FIG. 6 shows communications of properly marked packets from a customer device to an edge router of a service provider network for a class that utilizes an additional burst marking upon exceeding the capacity of the standard class upon ingress to the service provider network according to an exemplary embodiment.
Figure 7:
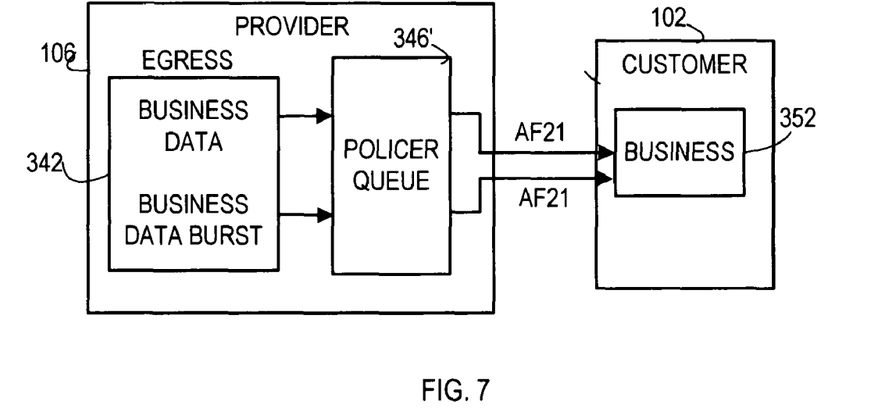
FIG. 7 shows communications of properly marked packets from an edge router of the service provider network to a customer device for a class that utilizes an additional burst marking upon exceeding the capacity of the standard class upon egress from the service provider network according to an exemplary embodiment.

In addition to customers benefiting from different Best Effort queues, depending upon home customers versus business customers, the quality of service may provide additional burst queues for one or more classes of service for use in a particular quality of service option purchased by the customer. FIGS. 6 and 7 show an example where a business class is provided with a business priority queue and a business data burst queue for providing additional bandwidth for transfer of business class packets. As shown in FIG. 6, the customer edge router 102 includes business queue 306 that marks the business packets as AF21. The policer 310' of provider edge router 106 then detects whether the bandwidth allocated for the business class corresponding to AF21 is being exceeded by the number of AF21 packets from the customer. If so, rather than dropping the excess packets, the policer marks the packets to be transferred as EXP 2 and then marks the excess packets as EXP 3 to indicate these packets are transferred in burst mode, and the labeled packets are placed in the ingress queue 316' accordingly in preparation for forwarding into the core.

At EXP 3 the customer is able to burst their data to wire speed. WRED is configured in this queue 316', and in times of congestion, the EXP 3 traffic is dropped before the EXP 2 (AF21) traffic. The EXP 3 traffic allows burst traffic to have a higher drop probability, but maintaining a better service than Best Effort.

FIG. 7 shows that the business data and business burst data that is received into the provider edge router 106 and the egress queue 342'. The policer 346' then removes the MPLS labels and the burst and non-burst business packets are forwarded to the customer edge router 102 with the AF21 business class markings where they are received into the ingress queue 352.

As shown in FIGS. 6 and 7, the AF queue is configured as a core queue and will hold the two classes of service, EXP 2 for priority data and EXP 3 for priority data burst and IP-VPN Best Effort data. The AF queue uses WRED to control traffic in times of congestion. It drops packets based on the drop probability settings for each class of service. For example, if the AF queue becomes congested, the EXP 3 traffic will be dropped first, then EXP 2 traffic. The probability that a packet will be dropped is based on the minimum threshold, maximum threshold, and mark probability denominator. When the average queue size is above the minimum threshold, WRED starts dropping packets. The rate of packet drop increases linearly as the average queue size increases until the average queue size reaches the maximum threshold. The mark probability denominator is the fraction of packets dropped when the average queue size is at the maximum threshold.

For example, if the denominator is 512, one out of every 512 packets is dropped when the average queue is at the maximum threshold. When the average queue size is above the maximum threshold, all packets are dropped. The minimum threshold value is set high enough to maximize the link utilization. If the minimum threshold is too low, packets may be dropped unnecessarily, and the transmission link will not be fully used. The difference between the maximum threshold and the minimum threshold should be large enough to avoid global synchronization of TCP hosts (global synchronization of TCP hosts can occur as multiple TCP hosts reduce their transmission rates). If the difference between the maximum and minimum thresholds is too small, many packets may be dropped at once, resulting in global synchronization.

In order to minimize the delay associated with forwarding the packets and any jitter, or variation in the interval spacing of the packets, the burst size or committed burst for one or more of the policers may be constrained to a relatively small number. For example, the aggregate policing of the incoming packets of a data connection to a customer may have a committed burst set to an amount such as 200 ms. In contrast, the per class policing of the incoming packets per class of the data connection to the customer may have a committed burst set to a much smaller amount such as 10 ms. To the extent the committed burst is exhausted for a particular class, then the burst number for that class may be replenished at the line rate. When the number of bytes available for transfer at the stated rate for a class have been exceeded, including any extra allocation that is available for handling high traffic periods, the packets for that class are dropped until the number of bytes available for transfer at the stated rate for that class is replenished.

Figure 8:
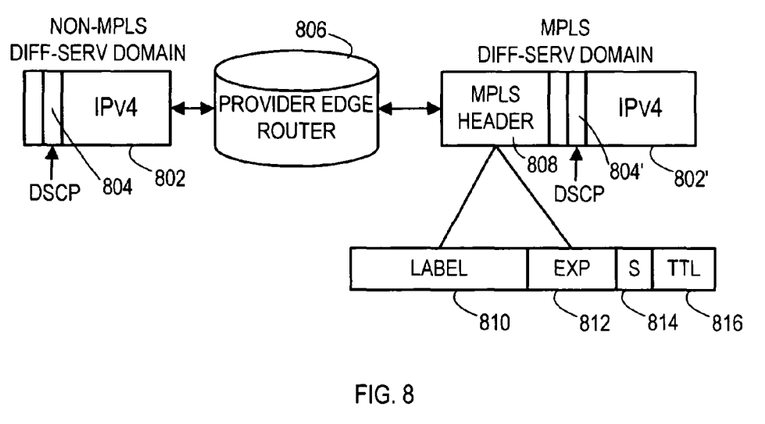
FIG. 8 shows the marking of data packets on the customer side and the core side of an edge router of a service provider network that implements a label switching protocol according to an exemplary embodiment.

FIG. 8 shows that the data packet from the customer, such as an IPv4 packet 802 having a DSCP code 304, is transferred from the customer to the provider edge router 806 in a non-MPLS differentiated services domain according to an exemplary embodiment. However, the provider edge router may forward the packets into the network core which implements an MPLS differentiated services domain. In this case, the provider edge router 806 encapsulates the IPv4 packet within an MPLS label thereby tunneling the IPv4 packet through the MPLS domain while maintaining the class of service handling of the data packets. The MPLS header 808 includes various segments such as a label segment 810, an experimental marking segment 812, and additional segment 814 and time-to-live (TTL) segment 816. It will be appreciated that when tunneling the packets of the various classes through the MPLS domain of the network core, the MPLS label marking may change from one core router to the next depending upon how the Per-Hop-Behavior of each core router is configured.

Figure 9:
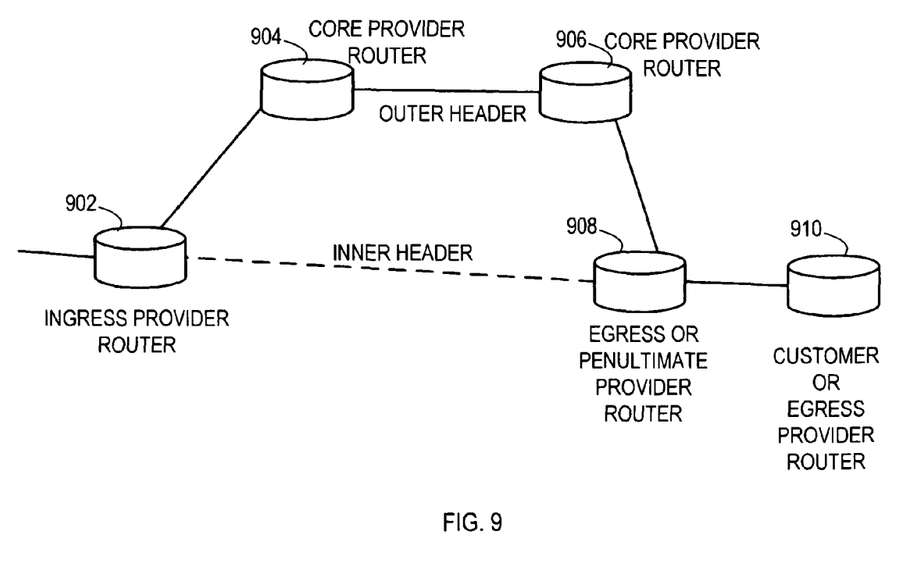
FIG. 9 shows an interconnection of edge and core routers for the implementation of pipe models for transport of packets of varying classes of service according to an exemplary embodiment.

There are three distinct MPLS DiffServ tunneling modes which are described in RFC 3270 including a uniform mode, a short pipe mode, and a pipe mode. FIG. 9 shows an exemplary configuration of edge and core routers and consideration of an inner header, e.g., the IP header with the DSCP code, and consideration of an outer header, e.g., the MPLS header. The inner header is relevant to the ingress provider edge router 902 where the MPLS header is then applied. Thereafter through the core routers 904 and 906, the outer header is considered. The inner header is then relevant again at router 908, which may be an egress provider edge router or a penultimate provider router depending upon the pipe mode chosen. Where the router 908 is an egress provider edge router, then router 910 corresponds to a customer edge router. Where the router 908 is a penultimate provider router, then router 910 corresponds to an egress provider edge router.

Various embodiments are described above. Details of one particular example of an implementation follow. This example is provided only for purposes of illustration and is not intended to limit the scope of the present disclosure.

Per Hop Behavior

The following lists the per hop behaviors implemented in a service provider network. The following statements provide high-level guidance on the Quality of Service QoS policies for one particular implementation. Short pipe is used. Resource allocation must be work conserving. Four valid customer markings supported including DSCP 46 for Real-time, DSCP 34 for Interactive, DSCP 18 for business, DSCP 0 plus all other markings for best effort (default class).

Four queues in the core (Trunk) includes Real-time queue (EXP5) with RED, Interactive queue (EXP 7) with RED, Business queue/Business Burst (EXP2/3) with WRED, Business Best Effort (EXP1) with WRED for EXP 0 and Best Effort (EXP0).

Four queues on the edge (Trib) includes, Real-time queue (DSCP46), Interactive queue (DSCP34), Business queue (DSCP18), Best effort (DSCP0+all others).

IP-VPN PE Ingress from CE

Real-time (DSCP46 to EXP 5 Core) must be received with DSCP 46. Bandwidth limited on Ingress to contracted rate with policer. Conforms forward and exceeds drop. Provides policer details for management placed in Trunk-Real-time queue on core facing interface and marked EXP 5. It is also placed in Trib-Real-time queue on "hairpin" interfaces based on CPE marked DSCP 46.

Interactive (DSCP 34 to EXP 7 Core) must be received with DSCP 34. Bandwidth limited on ingress to contracted rate with policer. Conform forward, exceed drop. Provide policer details for management placed in AF41 queue on core facing interface and marked EXP 7, and placed in AF41 queue on "hairpin" interfaces.

Business (DSCP 18 to EXP2/3 Core) must be received with DSCP 18. Bandwidth policed on ingress to contracted rate with policer. Conforms forward and exceeds remark EXP 3 and forward. Provide policer details for management. Compliant placed in trunk-Business queue on core facing interface and marked EXP 2. Non-compliant (Burst) placed in trunk-Business queue on core facing interface and marked EXP 3 and placed in Trib-Business queue on "hairpin" interfaces based on cpe marked DSCP 18.

Best Effort (DSCP0 or DSCP <>[46,34,18 to EXP1 Core] should be received with DSCP 0; however all DSCP that does not match DSCP 46, DSCP 34, or DSCP 18 will be treated as Best Effort. Bandwidth is not limited on ingress. Conforms forward and exceeds forward. Provides policer details for management, placed in trib-Best Effort queue on "hairpin" interfaces and is placed in trunk-Business-best-effort on core facing interface and marked EXP 1

IP-VPN PE Egress to CE is shaped on virtual interfaces to the provisioned line rate; e.g., 512 Kbps for a 512 Kbps local loop customer and applies to all subinterfaces.

Real-time traffic (DSCP46) Bandwidth limited on egress to contracted rate with policer. Conforms forward and exceeds drop. Provides policer details for management and is placed in trib-Real-time queue which is a priority (llq) queue.

Interactive (DSCP34) Bandwidth limited on egress to contracted rate with policer. Conforms forward and exceeds drop. Provides policer details for management. Provides x Percent of Bandwidth not used by trib-Real-time queue and is placed in trib-Interactive queue Business (DSCP18) Bandwidth not limited on egress. Conforms forward and exceeds forward. Provides policer details for management and providesx Percent of Bandwidth not used by trib-Real-time queue.

Best Effort Bandwidth not limited on ingress. Conform forwards and exceeds forward. It provides policer details for management. Provides 10 Percent of Bandwidth not used by Real-time queue and provide policer details for management.

IP-VPN PE Egress to P

Real-time (EXP5) is placed in trunk-Real-time queue on core facing interface and marked EXP 5.

Interactive (EXP7) is placed in AF41 queue on core facing interface and marked EXP 7. Reserves 40 percent of bandwidth remaining after trunk-Real-time queue is serviced. IP Prec 6 traffic is also placed in this queue and marked EXP 6. It uses WRED to distinguish between EXP 6 and EXP 7 traffic; All EXP 7 to be discarded before any EXP 6.

Business/Business Burst/Business Best Effort (EXP2/3) is placed in AF21 queue on core facing interface and marked EXP 2 or 3 depending on in or out of contract. Reserves 30 percent of bandwidth remaining after trunk-Real-time queue is serviced. It uses WRED to distinguish between EXP 2 and EXP 3 traffic; All EXP 3 to be discarded before any EXP 2.

Business Best Effort (1) is placed in BBE queue. EXP is set to 1. Reserves 10 percent of bandwidth remaining after trunk-Real-time queue is serviced. It provides policer details for management and uses RED to discard EXP 7 traffic if there is congestion. Allow EXP 6 traffic to backup until tail drop.

Best Effort (0) is Placed in Class-default queue set EXP 0. Reserves 20 percent of bandwidth remaining after trunk-Real-time queue is serviced. Provides policer details for management Additional Technical Details In addition to these issues the following mechanisms are implemented to ensure proper Quality of Service (QOS) behaviors.

Traffic shaping is used on egress for all routes to smooth out traffic bursts. The policer burst sizes are set to one MTU on input to avoid a "burst" effect on the queues which will adversely affect QOS. Since there are issues with arrival rates the burst sizes on egress are set to 30% greater than the ingress burst size. This avoids token bucket depletion when traffic is received at a Gigabit Line rate but transmitted at a much smaller line rate towards the customer. The problem is caused by traffic bunching up. A 1500 byte packet being read in from a CPE link will take a certain amount of time to be completely read into the serving PE router. That same 1500 packet will then be transmitted out the core interface at a gigabit line speed. If multiple packets are destined for the same CPE router then they could arrive at the destination PE at a faster rate than they arrived at serving PE router.

A second issue is that as maximum line rate, 100% utilization, is reached there is no "slack" for QOS mechanisms to deal with traffic. To offset this issue low speed circuits, less than 1.544 Mbps are shaped to 10% less than the maximum bandwidth available. This means that a 1 megabit customer would actually be shaped to 900 Kbps. For high speed circuits the shaper is set to 5% below the maximum bandwidth available.

Related to the previous issue, is a problem when there is a virtual circuit with much more bandwidth than the last mile circuit. For example, a DS-3 may be used between an Internet backbone and the frame relay switch. This DS-3 supports many customers. On the egress local loop from the frame relay switch the local loop is the actual contracted rate. For instance a 512 Kbps circuit would have a 512 Kbps local loop. If the DLCI on a DS-3 is set to shape to 512 Kbps there will be a problem when it reaches the physically constrained 512 kbps local loop. That is because traffic shaped to 512 Kbps can actually send a little more than 512 kbps of traffic because of the burst capability built into the shaper algorithm. When this excess traffic gets to the frame switch there is exactly 512 kbps of bandwidth and the burst is randomly discarded. This random discard will affect all classes of service. Therefore the shape command is set to 10% below maximum on 1.544 Mbps and below circuits and 5% below for all high speed circuits.

To facilitate transmission of voice traffic on lower speed frame relay links (768 Kbps and below) FRF.12 is enabled. However FRF.12 by itself will only fragment packets. Therefore the LLQ is enabled and the fragment size is set to 300 bytes for all packets. This size should be larger than all voice packets. The combination of FRF.12 and the LLQ QOS behavior will allow the fragmented packets to be interleaved with the non-fragmented voice packets which should be in the LLQ. This insures that small time sensitive voice packets are not delayed while larger data packets are streamed on to the access line. In theory no voice packet should have to wait longer than the time it takes one fragment to be placed on the line.

While the invention has been particularly shown and described with reference to various embodiments thereof, it will be understood by those skilled in the art that various other changes in the form and details may be made therein without departing from the spirit and scope of the invention.

What is claimed is:

1. A computer executable program product tangibly embodied on a non-transitory computer readable medium comprising instructions that when executed by a computer perform acts comprising:
   receiving electronic packets from a plurality of users via a plurality of ports, wherein the packets are classified according to markings provided by each user that identify a class of service to which each packet belongs;
   detecting the marking of each packet and recognizing which user submitted the packet;
   detecting at a port whether a user is attempting to transfer packets of a class through the port at a bandwidth greater than the bandwidth assigned for that class at the port;
   when a user attempts to transfer packets of a class through the port at a bandwidth greater than the bandwidth assigned for that class, holding in a queue dedicated to the port the packets until time for transmission; and
   acting upon the packets in accordance with a bandwidth assigned for each class of service for each user to forward the packets with the assigned bandwidth, wherein the classes of service comprise a real-time class, an interactive class, a business class, and a best effort class and wherein the real time class has a priority based bandwidth allocation and the interactive class, the business class, and the best effort class each has a fixed bandwidth percentage of the bandwidth remaining after bandwidth is allotted to the real time class.

2. The computer program product of claim 1, wherein the markings are located within a header of the electronic data packets, the acts further comprising adding label switching headers to each electronic data packet and wherein the label switching header includes a label switching marking that identifies the class of the electronic data packet.

3. The computer program product of claim 1, wherein the assigned bandwidth for at least one class is a minimum bandwidth such that when a number of packets for one of the at least one classes exceeds the bandwidth assigned to the one class but a second class is not utilizing all of the bandwidth assigned to the second class, the bandwidth not being utilized for the second class is utilized to temporarily increase the available bandwidth for the one class.

4. The computer program product of claim 1, wherein a default class is assigned to packets that are not marked properly to indicate a class.

5. The computer program product of claim 1, wherein the classes of service are allocated an additional bandwidth from unallocated bandwidth when an allocated bandwidth is exceeded by a class in proportion to the classes of services minimum bandwidth allocation.

6. The computer program product of claim 1, wherein the interactive class of service is allotted substantially 50% of the bandwidth remaining after bandwidth is allotted to the real time class, the business class of service is allotted substantiality 40% of the bandwidth remaining after bandwidth is allotted to the real time class, and the best effort class is allotted substantially 10% of the bandwidth remaining after bandwidth is allotted to the real time class.

7. A device for establishing a quality of service for various classes of service for electronic data packets received from a plurality of user networks, comprising:
   a plurality of user ports, wherein each user port exchanges electronic data packets with a user network, and each port is dedicated to a particular user;
   a memory that stores a set of classes of service for each user port and stores a bandwidth for each class stored for each user port; and
   a processor that provides bandwidth for the electronic data packets exchanged through the plurality of user ports in accordance with the class of the electronic data packets detected from markings of the electronic data packets and in accordance with the bandwidth assigned to the class for each user port,
   wherein the processor implements a policer and a queue in memory for each class of service for each port,
   wherein the policer detects whether a user is attempting to transfer packets of a class through a user port at a bandwidth greater than the bandwidth assigned for the class and wherein the queue holds packets detected by the policer until time for transmission; and
   wherein the classes of service comprise a real-time class, an interactive class, a business class, and a best effort class; and
   wherein the real time class has a priority based bandwidth allocation and the interactive class, the business class, and the best effort class each has a fixed bandwidth percentage of the bandwidth remaining after bandwidth is allotted to the real time class.

8. The device of claim 7, wherein the markings are located within a header of the electronic data packets, and wherein the processor adds a label switching header to each electronic data packet and wherein the label switching header includes a label switching marking that identifies the class of the electronic data packet.

9. The device of claim 7, wherein the policer drops packets from the queue for a class when the user is attempting to transfer packets of a class through a user port at a bandwidth greater than the bandwidth assigned.

10. The device of claim 7, wherein the assigned bandwidth for at least one class is a minimum bandwidth such that when the processor detects that a number of packets for one of the at least one classes exceeds the bandwidth assigned to the one class but a second class is not utilizing all of the bandwidth assigned to the second class, the processor utilizes the bandwidth not being utilized for the second class to temporarily increase the available bandwidth for the one class.

11. The device of claim 7, wherein the processor assigns a default class to packets that are not marked properly to indicate a class.

12. The device of claim 7, wherein the interactive class of service is allotted substantially 50% of the bandwidth remaining after bandwidth is allotted to the real time class, the business class of service is allotted substantiality 40% of the bandwidth remaining after bandwidth is allotted to the real time class, and the best effort class is allotted substantially 10% of the bandwidth remaining after bandwidth is allotted to the real time class.

13. A method for providing a quality of service for various classes of service for electronic data packets, comprising:
   receiving packets from a plurality of users via a plurality of ports, wherein the packets are classified according to markings provided by each user that identify a class of service to which each packet belongs, wherein the classes of service comprise a real-time class, an interactive class, a business class, and a best effort class, and wherein the real time class has a priority based bandwidth allocation and the interactive class, the business class, and the best effort class each has a fixed bandwidth percentage of the bandwidth remaining after bandwidth is allotted to the real time class;

detecting the marking of each packet and recognizing which user submitted the packet;

implementing a policer and a queue in a memory for each class of service for each port, wherein the policer detects whether a user is attempting to transfer packets of a class through a port at a bandwidth greater than the bandwidth assigned for that class at the port and wherein the queue holds packets detected by the policer for transmission; and forwarding the packets within the assigned bandwidth for each class and user.

14. The method of claim 13, further comprising:
receiving the forwarded packets; and
forwarding the packets within the assigned bandwidth assigned for each class.

15. The method of claim 13, further comprising applying a label switching header to each packet, wherein the label switching header includes a marking that indicates the class of each packet.

16. The method of claim 13, wherein the interactive class of service is allotted substantially 50% of the bandwidth remaining after bandwidth is allotted to the real time class, the business class of service is allotted substantiality 40% of the bandwidth remaining after bandwidth is allotted to the real time class, and the best effort class is allotted substantially 10% of the bandwidth remaining after bandwidth is allotted to the real time class.

* * * * *